United States Patent
Lay et al.

(10) Patent No.: US 6,807,630 B2
(45) Date of Patent: Oct. 19, 2004

(54) METHOD FOR FAST REINITIALIZATION WHEREIN A SAVED SYSTEM IMAGE OF AN OPERATING SYSTEM IS TRANSFERRED INTO A PRIMARY MEMORY FROM A SECONDARY MEMORY

(75) Inventors: Tatchi Placido Lay, Austin, TX (US); Brien Henry Muschett, Palm Beach Gardens, FL (US); Allen Justin Ramlow, Austin, TX (US); Cuong Huu Tran, Austin, TX (US); Dung Huu Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 09/738,369

(22) Filed: Dec. 15, 2000

(65) Prior Publication Data
US 2002/0078338 A1 Jun. 20, 2002

(51) Int. Cl.⁷ .............................................. G06F 15/177
(52) U.S. Cl. .................. 713/2; 713/1; 714/15
(58) Field of Search ............................ 713/1, 2; 714/15

(56) References Cited

U.S. PATENT DOCUMENTS

| | | | |
|---|---|---|---|
| 5,269,022 A | 12/1993 | Kazuya et al. | 395/700 |
| 5,542,077 A | 7/1996 | Johnson et al. | 395/750 |
| 5,745,669 A | 4/1998 | Hugard et al. | 395/182.01 |
| 6,073,232 A | 6/2000 | Kroeker et al. | 713/1 |
| 6,080,207 A * | 6/2000 | Kroening et al. | 717/172 |
| 6,098,158 A | 8/2000 | Lay et al. | 711/162 |
| 6,393,560 B1 * | 5/2002 | Merrill et al. | 713/2 |
| 6,434,696 B1 * | 8/2002 | Kang | 713/2 |
| 6,519,698 B1 * | 2/2003 | Leyda et al. | 713/2 |
| 6,594,781 B1 * | 7/2003 | Komasaka et al. | 714/19 |

* cited by examiner

Primary Examiner—Thomas Lee
Assistant Examiner—Pranav Chandrasekhar
(74) Attorney, Agent, or Firm—David A. Mims, Jr.; J. Davis Gilmer

(57) ABSTRACT

The invention relates to a computer in which an image of the operating system is maintained in a secondary memory. This memory is either powered from a source independent of the main memory, or is non-volatile in nature. When the computer is reinitialized, the loader software that normally builds the operating system from components instead checks the secondary memory for the presence of an operating system image. If such an image is detected, the loader transfers the image from the secondary memory to the primary memory and transfers control of the computing system to the image of the operating system now in the primary memory. If no image is detected, the loader operates in a standard fashion. Additionally, a complete system image may be stored in the secondary memory. This would include the contents of the primary memory, the contents of the virtual memory, and the system state. As such, a preexisting version of an operational computing system may be directly loaded at boot time.

21 Claims, 6 Drawing Sheets

METHOD FOR FAST REINITIALIZATION WHEREIN A SAVED SYSTEM IMAGE OF AN OPERATING SYSTEM IS TRANSFERRED INTO A PRIMARY MEMORY FROM A SECONDARY MEMORY

BACKGROUND OF THE INVENTION

1. Field of the Invention

The present invention generally relates to computer systems. More particularly, the invention relates to a computer able to start an operating system in a "fast" mode from a secondary memory.

2. Description of Prior Art

Typical operating systems are initiated when a user powers on a computer device. Upon powering on, the computing device initially transmits information about the hardware characteristics of itself to an initial bootstrap sequence that enables the computing device to "use its own resources." In many personal computers, the parameters of the computer are impeded within a BIOS. Upon determination of the parameters of the computer system, typically the computer will immediately load in a machine instruction set from a preset point on a fixed memory medium. During a full boot process, the computing system initiates a set sequence of activities to build a system image that will operate the computing system.

In the full boot process in a typical computing system, the computing machine program assembles and loads the various components of the operating system, eventually building an image of the system in the primary memory. After building a system image, the computing system transfers control of the function of the computing system to the system image.

In a typical full boot process, the computing system seeks out all the various components of the eventual system image contained on the permanent or semi-permanent memory medium, such as a hard disk. As such, a number of slower media accesses are necessary, as well as the time for the processing unit to actually perform the operations on the material accessed. Thus, in the full boot process, the computing system needs quite a bit of time to seek out and load the various components to make a system image.

Once the image of the system is complete in the primary memory, the boot process transfers operational control of the computing device to the system image assembled in the primary memory. As such, in a typical full boot or initialization process, the steps of the seeking, compiling, and assembling the various components of the system image into a cohesive operational unit may take a relatively long period of time.

In many mission-critical applications, such a reinitialization or reboot of a computer is time-critical. As such, the reinitialization of a computing system after a crash or other form of stoppage is hampered by the necessity of the boot process in to finding, loading, and assembling all the different components of the operating system into a single cohesive image.

Many other problems and disadvantages of the prior art will become apparent to one skilled in the art after comparing such prior art with the present invention as described herein.

SUMMARY OF THE INVENTION

Various aspects of the invention may be found in a computing system containing a primary memory and a secondary memory. The secondary memory is either powered independently from the main computing system and primary memory, or is non-volatile memory that may be written and overwritten by the computing system itself. In exemplary embodiments, the secondary memory is powered by a battery or rechargeable power source. Or, the secondary memory may be an electrically erasable programmable memory (EEPROM).

When the computing system is initiated, the computing system is directed to save an image of the system to the secondary memory. Due to the fact that this secondary memory is unaltered when the computing system crashes or is otherwise reinitialized, the system image can be reloaded directly into the primary memory. As such, the computing system need not perform a full boot or reinitialization process to restart the computing system from scratch.

Additionally, the boot process may detect whether any such system image resides in the secondary memory. If so, the computing system during the boot process may transfer the stored system image to the primary memory and mask off the secondary memory to the operating system. If not, the computing system during the boot process may free the secondary memory for normal use by the operating system.

Other aspects, advantages and novel features of the present invention will become apparent from the detailed description of the invention when considered in conjunction with the accompanying drawings.

DESCRIPTION OF THE PREFERRED EMBODIMENT

Figure 1:
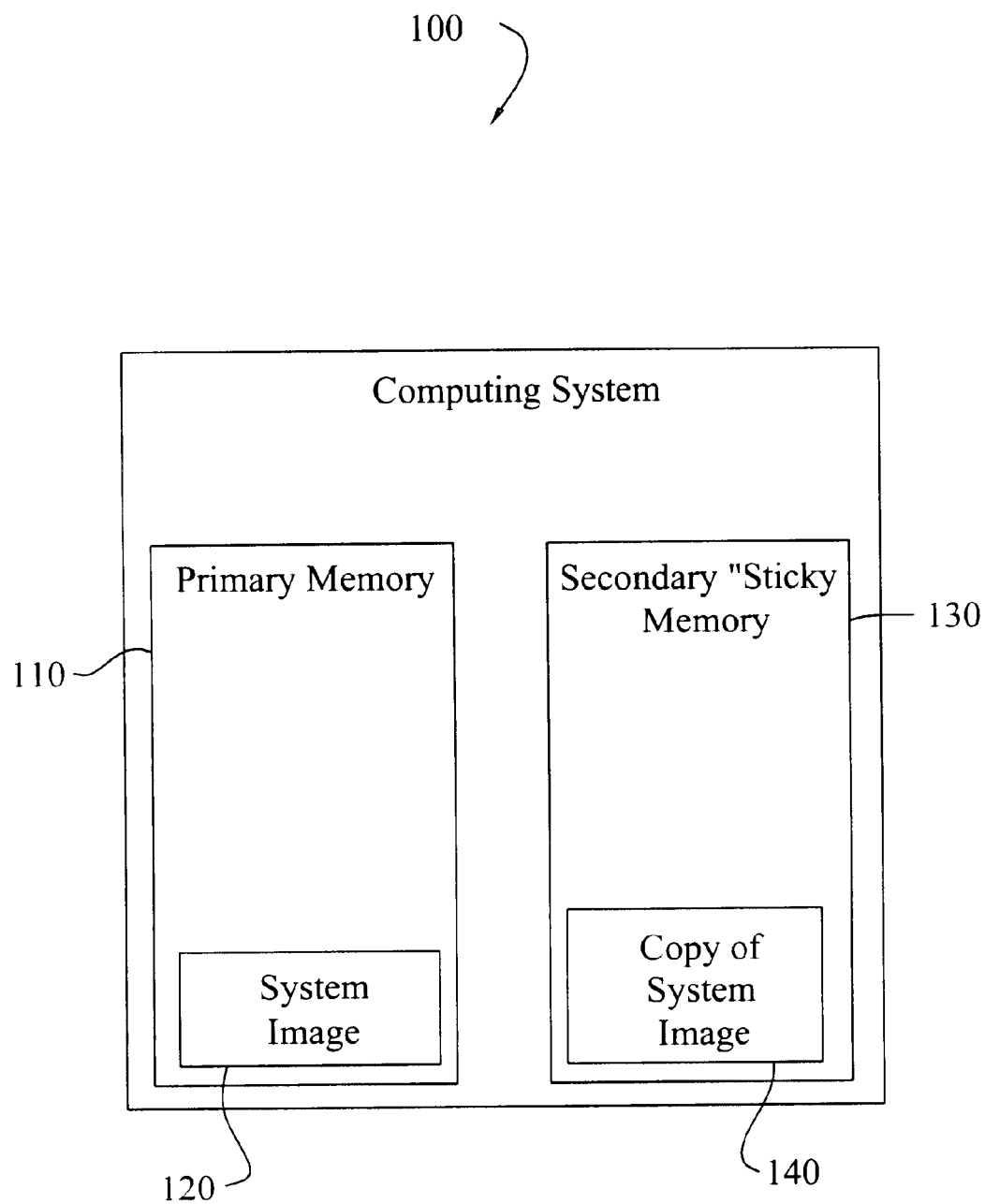
FIG. 1 is a schematic block diagram of a fast bootable computing system according to the invention.

FIG. 1 is a schematic block diagram of a fast bootable computing system according to the invention. A computing system 100 contains a primary memory 110. During typical operation of the computing system 100, the primary memory 110 will contain a system image 120 that operates the computing system 100. The system image 120 is the software that is complied, collated, and run in the normal boot process of the computing system 100 in order to execute the full functionality of the computing system 100.

It should be noted that the system image 120 may exist fully in the primary memory 110, or may be stored in components parts in a slower storage media such as a hard disk or other type of virtual memory scheme. As contemplated in the invention, at any time the system image may be saved as a "snapshot" of the image at that particular time. Such a "snapshot" of the system image may be used to save the steps in the boot process of locating, loading, and compiling the various components into another system image. In this case, the work performed in the boot process in compiling and making the system image 120 for execution, if saved, can be retrieved at a later time to speed up the boot process of reinitializing the system image.

In this case, after the boot process initially builds the system image 120, the computing system 100 stores an image of the operating system in a secondary memory 130. As such, the secondary memory 130 has a backup system image 140 contained within it. It should be noted that the secondary memory 130 and the primary memory 110 should be either independently powered or the secondary memory 130 should be some form of non-volatile memory (NVM). As such, when the power to the computing system 100 and primary memory 110 fails, or the computing system 100 is otherwise reinitiated, the secondary memory 130 containing the saved system image 140 will still retain the saved system image 140 after the reinitialization of the computing system 100.

As noted previously, the secondary memory 130 may be powered by an independent power source, such as a battery or a rechargeable battery. Or, the secondary memory 130 may be some sort of NVM, such as a "slow" read/write memory. In this case, the secondary memory 130 could be an EEPROM. The EEPROM may be written with the system image while the computing system 100 is in use.

Thus, when the power to the computing system 100 fails, or the computing system 100 otherwise reinitializes, the computing system 100 may load the saved system image 140 directly from the secondary memory 130 into the primary memory 110 upon a restart. As such, the steps of the loader in collecting, compiling, and organizing a new system image may be obviated.

As such, upon reinitiation of the computing system 100 after any such failure, the computing system 100 would be operational within a much shorter time frame than when the computing system 100 needs to reassemble the system image in a conventional manner. This is due to the fact that the saved system image 140 is already contained within the computing system 100, whereby it would be loaded in a relatively extremely fast manner with respect to a normal reinitialization.

It should be clear to one skilled in the art that the computing system 100 may be any of a number of combinations of hardware and software. Additionally, the computing system may be any electronic device having a solid state memory and requiring any form of operating system, including personal digital assistants, "smart" appliances, or so-called "smart cards."

Additionally, the computing system may, from time to time, write the copy of the system image to the secondary memory. The computing system may write the system image to secondary memory upon the transfer of control of the computing system to the operational system image, or such saving may take place upon any predefined event. Or, such saving may take place upon the initiation of a command from a user, or a remote system administrator. Or, if, upon an initialization wherein the computing system determines that no system image is present, the computing system may immediately write the system image to the secondary memory as an initial step in normal operation.

Figure 2:
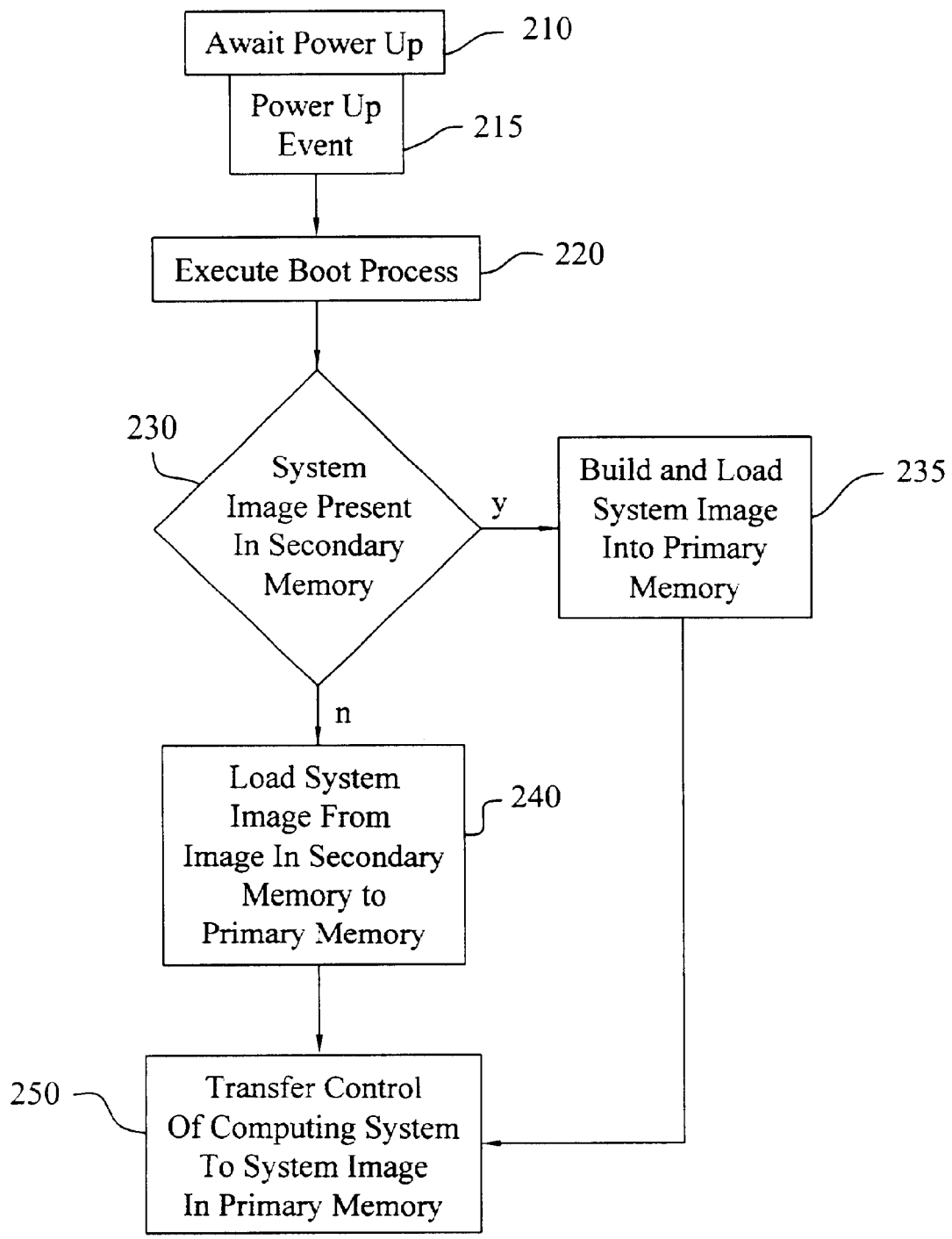
FIG. 2 is a logical block diagram of the method by which the computing system of FIG. 1 may operate.

FIG. 2 is a logical block diagram of a method that may be employed by the computing system of FIG. 1. In a block 210, a computing system awaits power-up. In a block 215 the computing system has received the initiation of power-up and runs a boot process for the computing system.

In a block 220 the computing system executes the boot process for building an operational system image that controls the actions of the computing device. In the course of operation, the boot process determines whether a saved system image is present in a secondary memory in a block 230. If the saved system image is not present in the secondary memory, the loader assembles the operational system image in a conventional manner in a block 235. After assembling the operational system image from the component parts accessible to the computing system in the block 235, the boot process transfers control of the computing system to the operational system image thus assembled in a block 250.

However, if a previously saved system image is present in a secondary memory in the block 230, the boot process transfers the saved system image from the secondary memory to the primary memory in a block 240. Once the transfer of the saved system image to the primary memory has completed, the operational state of the system has been restored. Next, the transferred system image is initiated in the block 250.

Figure 3:
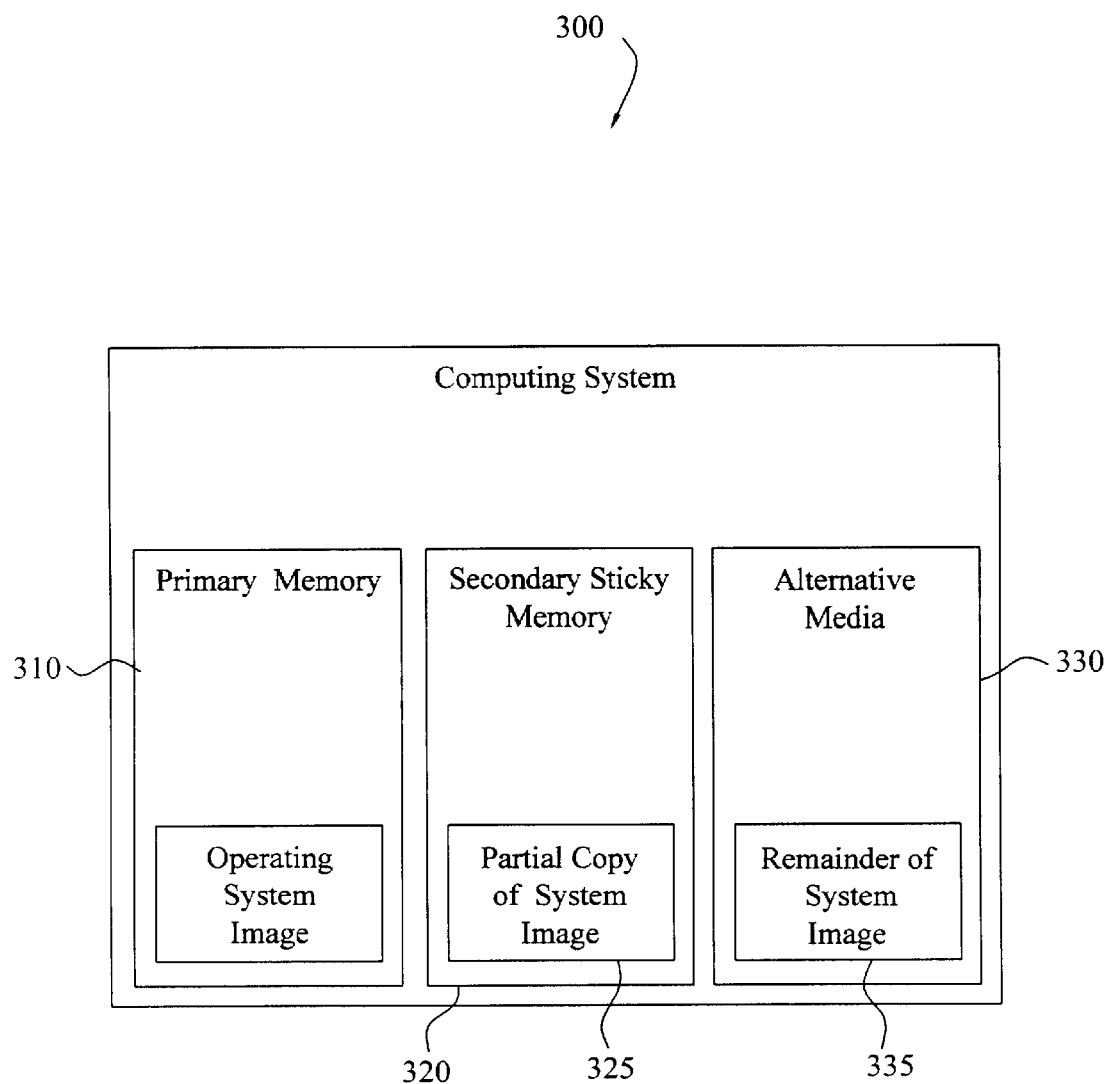
FIG. 3 is a schematic block diagram of an alternative embodiment of the invention of FIG. 1.

FIG. 3 is a schematic block diagram of an alternative embodiment of the invention of FIG. 1. A computing system 300 has a primary memory 310, a secondary memory 320, and a slower memory media 330. The slower memory media 330 may be such a form as a magnetic hard disk, an optical disc, or other form of slower memory media.

In this case, the secondary memory 320 contains a partial system image 325. This may occur when the system image of the computing system 300 is larger than the secondary memory may fully contain. In this case, the remainder of the system image may be contained on the slower memory media 330 as another partial system image 335.

When the computing system 300 fails or is otherwise reinitialized, a reboot of the computing system 300 is necessary. During such reinitialization, the boot process of the computing system 300 determines whether a partial system image 325 is contained in the secondary memory 320. When this occurs, the boot process may also determine that the remaining portion or portions of the system image are contained in the memory media 330, ie. the partial system image 335. As such, the boot process loads the partial system image 325 into the primary memory, and adds the partial system image 335 from the slower memory media 330 to that already transferred to the primary memory 310 from the secondary memory 320. When both partial system images are assembled in the primary memory 310, a full system image is present and ready to be run by the computing system 300 as an operational system image.

Figure 4:
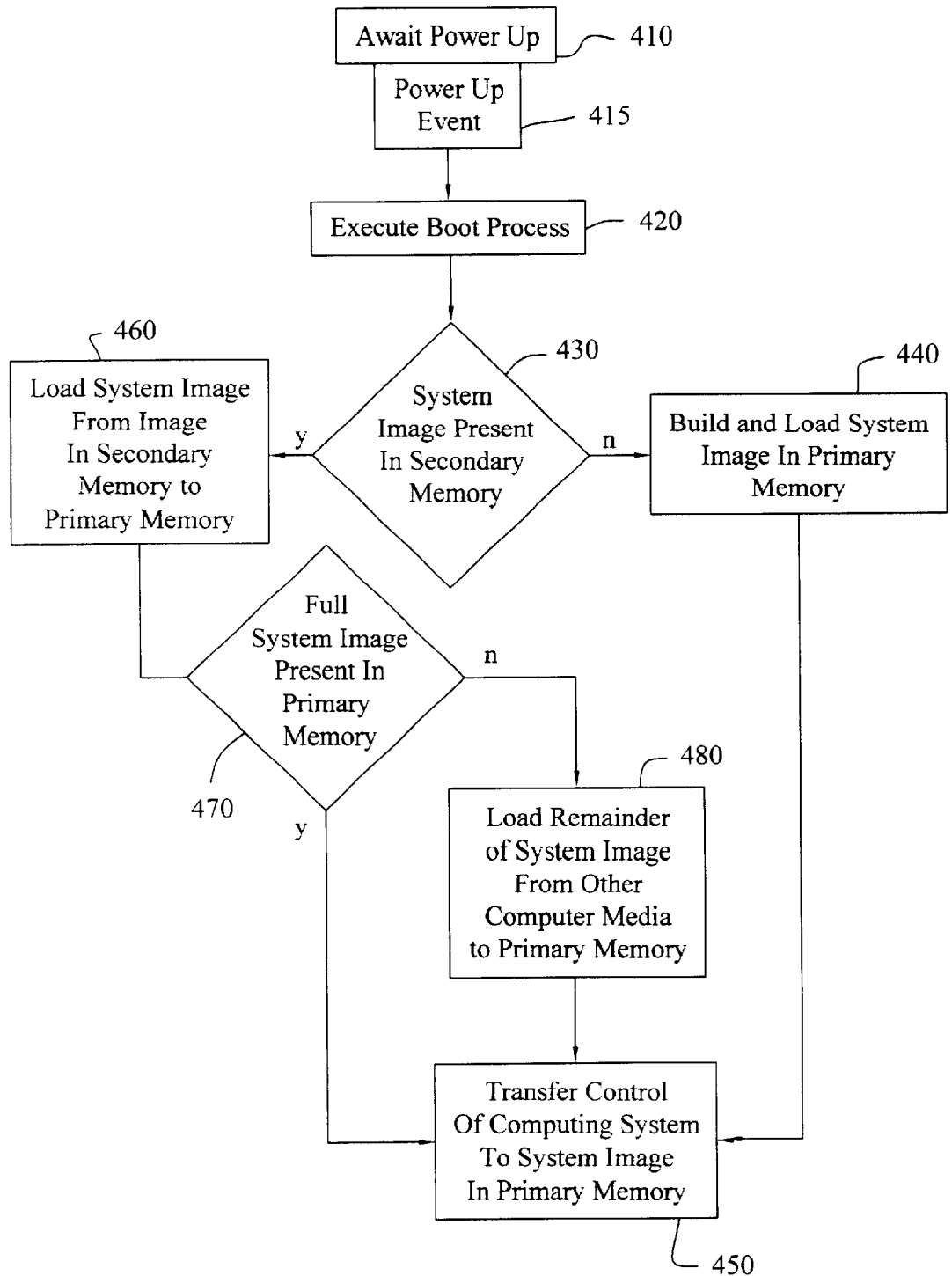
FIG. 4 is a block diagram of a method by which the invention of FIG. 3 may be implemented.

FIG. 4 is a block diagram of a method by which the invention of FIG. 3 may be implemented. In a block 410, the computing system awaits a power-up event. Power-up occurs in a block 415, and the computing system initiates a boot process in a block 420. In a block 430, the boot process determines whether a secondary memory has a system image contained in it.

If the secondary memory does not have a saved system image in it, the boot process initiates a typical assembling and loading of the operational system image in a block 440. Upon assembling and loading of the system image in the block 440, the computing system transfers control to the assembled and loaded system image in a block 450.

However, if the boot process detects that a saved system image is already contained within a secondary memory in the block 430, the boot process loads that saved system image from the secondary memory into the primary memory in a block 460. The boot process then checks if this image is a full or partial system image in a block 470. The system image contained in the secondary memory may contain a flag indicating whether the saved image is a full or partial system image.

If the system image contained in the secondary memory is determined to be a full system image, the boot process transfers control of the computing system to the system image contained in the primary memory, as shown in the block 450. However, if the secondary memory does not contain a full system image in the block 470, the boot process looks to another memory media, such as a hard disk, for the remainder of the system image. Upon finding the remainder of the system image, the boot process transfers the remaining portions of the system image from the alternative memory media into the primary memory in the block 480. As before, boot process then transfers control of the computing system to the system image contained in the primary memory, as shown in the block 450.

Figure 5A:
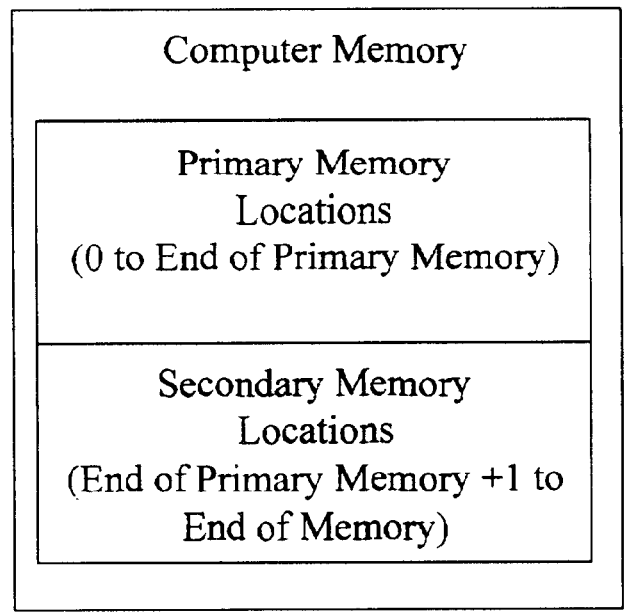
FIGS. 5a and 5b are logical diagrams showing the relationship within a memory map of the primary and secondary memories of possible embodiments of the inventions of FIGS. 1 and 3.
Figure 5B:
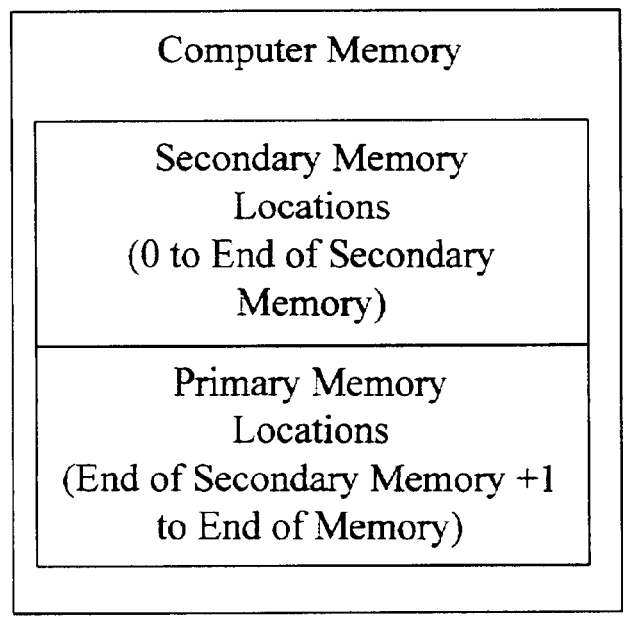

FIGS. 5a and 5b are logical diagrams showing the relationship within a memory map of the primary and secondary memories of possible embodiments of the inventions of FIGS. 1 and 3. In FIG. 5a, the secondary memory operates at a higher memory address than the primary memory. It should be noted that the secondary memory may contain any system image that has been previously stored into it. A computing system parameter check, such as a BIOS in many common personal computers, may determine the extent and type of the memory configuration within the computing system. In this case, the computing system would recognize that the secondary memory occupies the higher memory.

The computing system recognizes that the primary memory contains all the memory locations lower than the starting memory address of the secondary memory. Sufficient secondary memory should be provided that a system image may be stored as detailed in FIG. 1 or in FIG. 3. Typically, a secondary memory storage of 32 megabytes is sufficient, although more may be utilized.

Upon a normal initialization of the computing system, the boot process determines whether the sticky fast boot feature is enabled. In this is the case, the boot process masks out the upper memory locations corresponding to the secondary. As such, the operating system, when running, will not allow access to the secondary memory.

In the normal operation, the operating system will not allow access to the upper memory locations, nor will it be able to overwrite the saved system image contained therein. When a request to save the system image is initiated, the operating system will then allow read and write access to the secondary memory region.

However, if the boot process determines that the fast image process is disabled, the boot process may free up the secondary memory locations. This would allow the operating system to utilize this secondary memory in a typical fashion.

FIG. 5b shows the converse case. This diagram exemplifies that the secondary memory need not exist in the higher memory addresses, but the system may also utilize the system when the secondary memory operates in the lower memory addresses.

Figure 6:
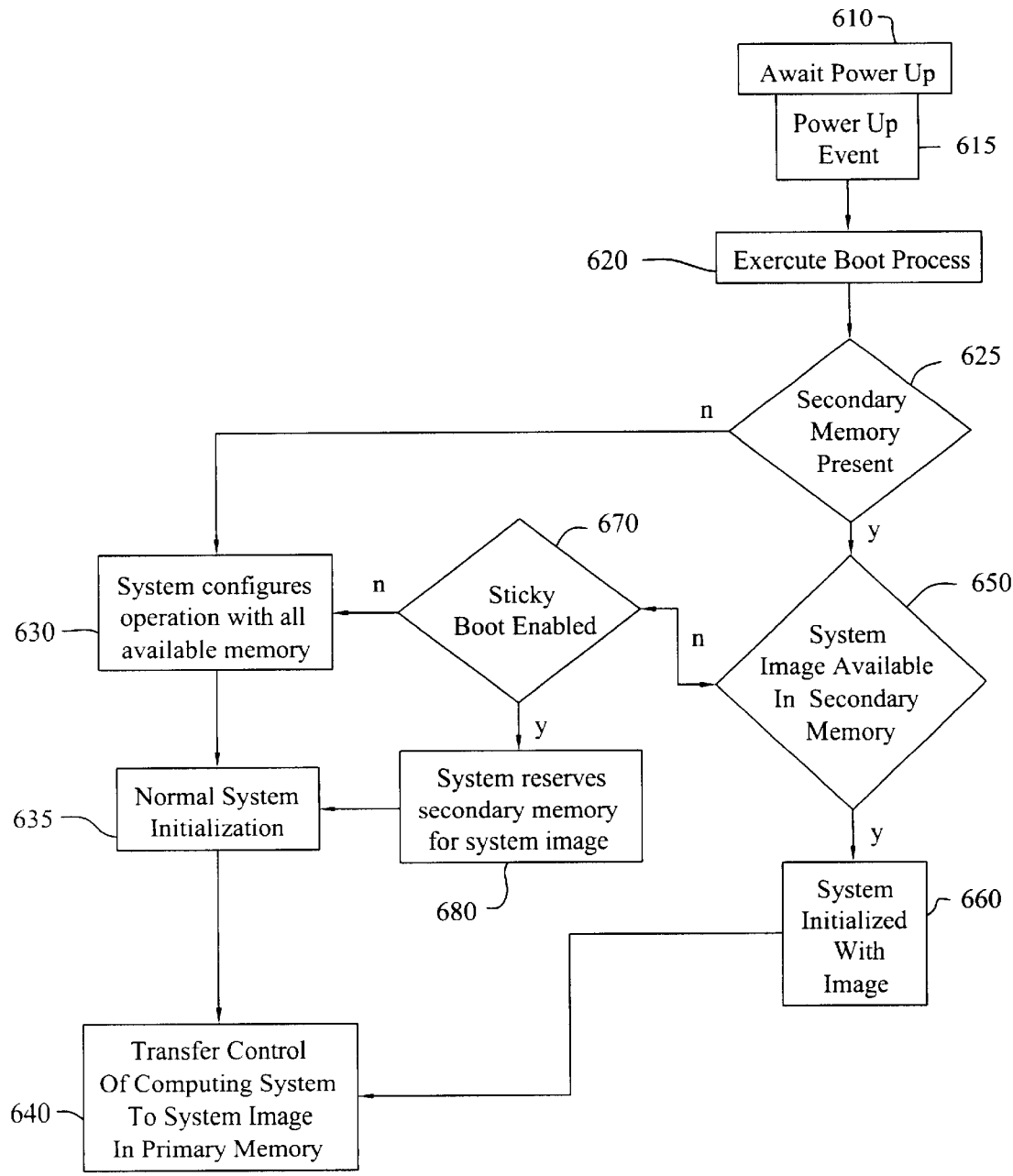
FIG. 6 is a block diagram indicating a method by which a computing system may perform such a masking operation in the memory configuration of FIG. 5.

FIG. 6 is a block diagram indicating a method by which a computing system may perform such a masking operation in the memory configuration of FIG. 5. In a block 610, the computing system awaits power-up. In a block 615, power-up has commenced and a boot process executes in a block 620.

In a block 625, the computer system determines whether the system contains a secondary memory. If no secondary memory is available, the computer system configures the computer system to operate with all available memory in a block 630. Next, the computer system proceeds with the initialization of operation in a typical manner through loading and compiling a system image into primary memory in a block 635. In a block 640, the computer system initiates operation with the system image contained in primary memory.

If a secondary memory is present, the boot process determines whether a previously saved system image is available in the secondary memory in a block 650. If so, the computing system is initialized using the image in a block 660, and the control reverts to the step 640, detailed above.

However if the system image is not available, the computing system determines if the sticky fast boot option is enabled in a block 670. If so, the computer system reserves the secondary memory for a system image in a block 680. The computing system then intializes in typical manner in the blocks 635 and 640, described previously.

If the sticky boot option is not enabled, the computing system configures the system to work with all the available memory in the block 630. The system then intializes in the manner prescribed by the blocks 635 and 640.

As such, a fast rebooting computer system is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

We claim:

1. A computer system comprising:

at least one processor;

a primary memory having a system image of an operating system stored therein and communicatively coupled to the at least one processor;

a secondary memory powered independently from and communicatively coupled to the primary memory;

an initialization component for determining if said system image is stored in said secondary memory, writing said system image into said secondary memory and blocking access to said secondary memory for normal operation of said computer system; and the initialization component detecting a restart from normal operation and unblocking access to secondary memory storing the system image of an operating system, the operating system being transferred to the primary memory upon restarting of the computer system.

2. The computer system of claim 1 wherein the image of an operating system further comprises a system image.

3. The computer system of claim 1 wherein the secondary memory 152 non-volatile memory.

4. The computer system of claim 3 wherein the secondary memory is an electrically programmable memory.

5. The computer system of claim 1 wherein the primary memory and the secondary memory are powered from different power sources.

6. The computer system of claim 1 further comprising a battery, and wherein the secondary memory is powered from the battery.

7. The computer system of claim 6 wherein the battery is a rechargeable battery.

8. A method of starting a computing system, the computing system comprising a primary memory, a secondary memory, comprising:

determining whether an operating system image is present in the secondary memory writing operating system image in the secondary memory if it is absent in the secondary memory, said secondary memory powered independently of the primary memory and blocked from being accessed during normal operation of said computing system;

unblocking and transferring the operating system image to the primary memory so that the operating system may control the operation of the computing device if such operating system image is present in the secondary memory; and reloading the operating system to the primary memory from a source other than the secondary memory if the operating system image is not present in the secondary memory.

9. The method of claim 8 wherein the secondary memory is powered by a battery.

10. The method of claim 9 wherein the battery is a rechargeable battery.

11. The method of claim 8 wherein the secondary memory is a non-volatile memory.

12. The method of claim 11 wherein the image of the operating system further comprises a previous image of a virtual memory.

13. The method of claim 8 wherein the secondary memory is an EEPROM.

14. The method of claim 12 wherein the image of the operating system further comprises a previous image of a system state.

15. A method of maintaining an operating system image for a computing system, the computer system having an operating system, a primary memory, and a secondary memory the method comprising:

creating an image of the operating system;

determining whether an operating system image exists in the secondary memory and if absent, storing at least a portion of the image of the operating system in the secondary memory and blocking access to the secondary during normal operation of said computer system; and transferring the at least a portion of the image of the operating system to the primary memory upon restarting of the computing system, wherein the computing system may run from the image of the operating system thus contained in the primary memory.

16. The method of claim 15 wherein the image of an operating system further comprises a system image.

17. The method of claim 15 wherein the secondary memory is a non-volatile memory.

18. The method of claim 17 wherein the secondary memory is an electrically programmable memory.

19. The method of claim 15 wherein the primary memory and the secondary memory are powered from different power sources.

20. The method of claim 15, the computer system further comprising a battery, and wherein the secondary memory is powered from the battery.

21. The method of claim 20 wherein the battery is a rechargeable battery.

* * * * *

UNITED STATES PATENT AND TRADEMARK OFFICE
CERTIFICATE OF CORRECTION

PATENT NO. : 6,807,630 B2
DATED : October 19, 2004
INVENTOR(S) : Lay et al.

It is certified that error appears in the above-identified patent and that said Letters Patent is hereby corrected as shown below:

Drawings,
Figure 2, Line between 230 and 235, please delete "Y" and replace with -- N --; and line between 230 and 240, please delete "N" and replace with -- Y --;

Column 6,
Line 38, please delete "152" and insert -- is a --;

Signed and Sealed this

Twenty-second Day of March, 2005

JON W. DUDAS
*Director of the United States Patent and Trademark Office*